United States Patent [19]
Fitton

[11] 3,790,396
[45] Feb. 5, 1974

[54] METHOD FOR STABILIZING PIGMENT SLURRIES

[75] Inventor: Robert C. Fitton, Bel Air, Md.

[73] Assignee: J. M. Huber Corporation, Locust, N.J.

[22] Filed: Nov. 5, 1971

[21] Appl. No.: 198,021

[52] U.S. Cl............. 106/288 B, 106/306, 106/308, 106/309
[51] Int. Cl.............................................. C09c 3/02
[58] Field of Search......... 106/288 B, 306, 308, 309

[56] References Cited
UNITED STATES PATENTS
2,698,256  12/1954  Shea, Jr. et al. ................. 106/308 B
2,786,777  3/1957  Allen ................................. 106/306

Primary Examiner—Delbert E. Gantz
Assistant Examiner—James W. Hellwege
Attorney, Agent, or Firm—Harold H. Flanders

[57] ABSTRACT

A method for stabilizing aqueous slurries of inorganic pigments which enables the slurries to be shipped or stored without the formation of a hard cake in the bottom of the tank or tank car, is disclosed. Aqueous slurries containing inorganic pigments such as hydrated silicas, calcium silicates, sodium alumino silicates and the like are stabilized by the addition of alkaline earth metal salts. An acidic material such as aluminum sulfate is also added to the slurry to adjust the slurry pH to about 6.0 to 8.6. The method of the invention is highly efficient and does not affect the characteristics or properties of the thus treated pigments.

2 Claims, 1 Drawing Figure

METHOD FOR STABILIZING PIGMENT SLURRIES

BACKGROUND OF THE INVENTION

1. Field of the Invention

This invention relates to inorganic pigments, and more particularly, to an improved method for stabilizing aqueous slurries of inorganic pigments which remain in uniform suspension.

2. Description of the Prior Art

As generally known in the art, when aqueous slurries of inorganic pigments are stored in tanks, shipped in tank cars, etc., the pigments settle from the slurry and form, at the bottom of the tank or tank car, a thick unpenetrable gel or cake which may have a thickness on the order of from one to two feet. The cake or "heel" is often topped by a skin or bridge which comprises a relatively thick hard layer of pigment. A flowable slurry and an upper layer of water is usually formed above the bridge.

When the slurry arrives at its destination or is stored for long periods, it is very difficult to pump the pigment out of the tank or tank car. The difficulty involved in emptying the tank cars, coupled with the resulting loss of pigment from the unstable slurry, is a significant problem. Thus the customer must spend much time and effort to remove the slurry. Also the supplier suffers due to the loss of the actual pounds delivered or credited.

To a large extent proposals directed to the stabilization of aqueous slurries of inorganic pigments and attempts to obviate the above problem have involved the use of various additives. In this regard it has been proposed in U.S. Pat. No. 3,291,626 to control the pH of aqueous slurries of inorganic pigments within certain ranges by the addition of acidic materials, such as aluminum sulfate or sulfuric acid. In this patent it is taught that the pH of the slurry must be maintained within a range from about 6.0 to 8.6 to stabilize and form a homogeneous system.

While a number of such proposals have been made and have achieved, to some extent, commercial acceptance, none have proved entirely satisfactory.

SUMMARY OF THE INVENTION

In the summary, the present invention relates to an improved method for stabilizing aqueous slurries of inorganic pigments which enables slurries of such pigments to be shipped in tank cars or stored in tanks without the formation of a hard cake or heel in the bottom of the car or tank. Stated broadly, the present invention is based on the unexpected discovery that the addition of certain inorganic salts and the subsequent reduction of the pH of the slurry, provides a slurry that is truly homogeneous and remains in uniform suspension for extended periods of time. In its broadest aspects the invention is directed to the stabilization of slurries which contain finely divided inorganic pigments including, but not limited to, hydrated silicas, precipitated aluminum silicates, alumina, sodium alumino silicates, calcium silicates and other fine particulates that are insoluble in an aqueous medium and which flocculate and settle out. The application of the method of the invention has also been found to be particularly advantageous when treating certain finely divided precipitated sodium alumino silicate pigments of sub-micron size.

It is accordingly a general object of the present invention to provide an improved method for stabilizing aqueous slurries of inorganic pigments.

A further and more particular object is to provide a new and improved method for forming pigment slurries which remain in uniform suspension for extended periods of time.

Yet a further object is to provide a method for stabilizing aqueous slurries of inorganic pigments by the addition of certain alkaline earth metal salts.

Still another object is to provide an improved method for stabilizing aqueous slurries of inorganic pigments in a manner such that the characteristics or properties of the thus treated pigments are not affected or changed.

The manner in which the foregoing and other objects are achieved in accordance with the present invention will be better understood in view of the following detailed description which discloses particularly advantageous method and composition embodiments for illustrative purposes.

DESCRIPTION OF PREFERRED EMBODIMENT(S)

Figure 1:
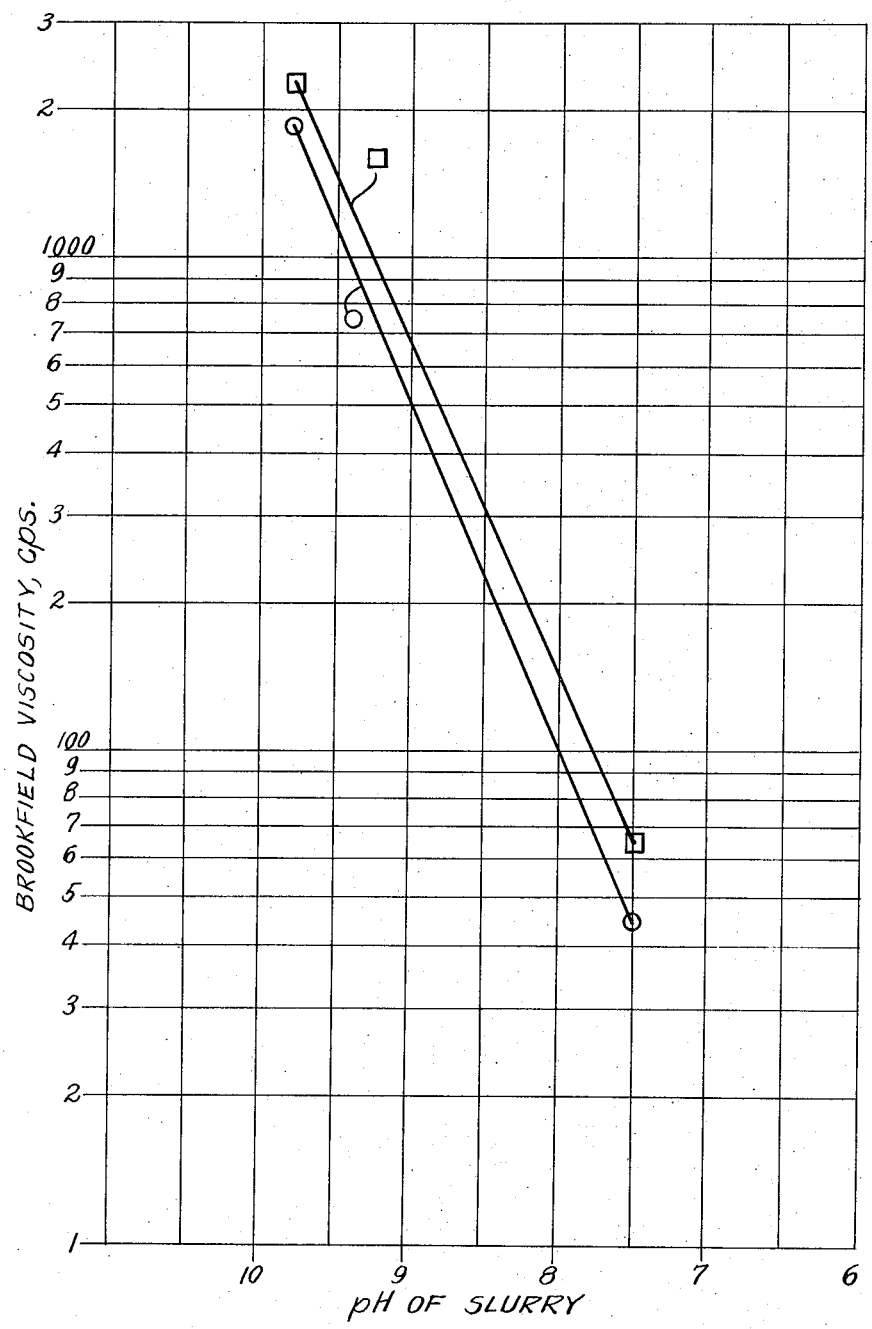

As discussed above, the present invention is directed to the stabilization of aqueous slurries of inorganic pigments by the addition of certain additives which do not affect the characteristics or properties of the pigments. In this regard, and as is well known in the art, finely divided inorganic pigments such as hydrated silicas, precipitated sodium aluminum silicates and the like are used in many and widely varying applications. Such pigments are used, for example, in coating papers, as reinforcing agents or fillers in rubber, in paints and in adhesives, etc.. Such pigments are often advantageously shipped in the form of aqueous slurries. It is, of course, very important in attempting to stabilize the slurry and to prevent the settling out and the formation of the hard cake or heel in the bottom of the tank or storage car, not to change the effectiveness of the pigment for its intended or ultimate use, e.g., as a paper filler.

In its broadest aspects the present invention is based on the remarkable discovery that the above and other objects of the invention can be achieved by the addition of certain inorganic salts, hydroxides and oxides, particularly magnesium hydroxide and other oxides or salts thereof, such as magnesium oxide, magnesium sulfate, magnesium phosphate, magnesium carbonate and magnesium chloride. However, other alkaline earth metal salts and hydroxides, such as calcium hydroxide, calcium oxide, calcium sulfate, etc., may be employed. In accordance with the present invention, it has been found that the use of $Mg(OH)_2$ or magnesium oxide (MgO) in a form such that it may be readily rehydrated are particularly advantageous and thus are preferred.

It has also been discovered that it is particularly advantageous to lower the pH of the thus treated slurry, i.e., following the addition of salt, by the addition of an acidic material, such as aluminum sulfate, etc., as disclosed in U.S. Pat. No. 3,291,626.

It may be noted here and before turning to more specific details of the invention that the use of the alkaline earth metal salts as disclosed herein affects the rheology of the slurry and that this has a substantial effect in preventing the slurry from fractionating, i.e., forming the hard cake or heel as previously discussed. For example, it has been discovered that the addition of magnesia or magnesium hydroxide forms a slurry having a viscous character but which becomes fluid rapidly under mild agitation.

The addition of the acidic substance, as discussed above further affects the rheology and enhances the stabilization of the slurry. In this regard the rheology and stabilization of the slurry are also materially affected by the manner of addition of the salt and acidic material. Thus to obtain maximum stabilization the magnesium salt has to be added to the aqueous slurry of inorganic pigments before or prior to the addition of the acidic substance.

Turning now to more specific details of the invention, the alkaline earth metal salt may be added to the slurry in an amount in the range of from about 0.10 to 10.0 percent by weight, based on the dry weight of the pigment. The use of less than 0.10 percent reduces the effectiveness of stabilization whereas an amount greater than 10.0 percent does not further enhance the stabilization of the slurry. From an economical standpoint, therefore, the use of an amount greater than 10.0 percent is not advantageous. The salt, which may be added to the slurry either as a dry powder or as a slurry thereof, is preferably added in an amount in the range of from 0.25 to 3.0 percent by weight, based on the dry weight of the pigment.

The acidic material may be aluminum sulfate, sulfuric acid, aluminum chloride, aluminum nitrate, or the like. So called "double" salts, such as $AlK(SO_4)_2 \cdot 12H_2O$, salts which are technically within the generic terms "alum," etc., may also be employed. The use of aluminum sulfate is particularly advantageous and is preferred. While acidic materials, suh as aluminum chloride and aluminum nitrate, may be employed these materials may introduce anions which are foreign or not compatible with paper coatings or when used as fillers in paper. Thus the use of a particular acidic substance will be governed by the intended use of the pigment. The acidic material is added to the slurry in an amount such that the pH of the slurry is reduced to the range of from about 6.0 to 8.6. Preferably the acidic material is added in an amount such that the slurry pH is from about 6.5 to 7.5.

In a particularly preferred method embodiment of the invention, the aqueous slurry of the inorganic pigments is stabilized by the addition of magnesium hydroxide or magnesium oxide followed by the addition of aluminum sulfate to lower the slurry pH to the range of from about 6.5 to 7.5. In addition, the combination of aluminum and magnesium salts and hydroxides, such as alumina and magnesium sulfate, followed by the adjustment of the pH by an acidic material such as $H_2SO_4$, can be advantageously employed.

Pigment slurries that may be advantageously treated according to the present invention are those containing, in an aqueous medium, at least about 10 percent of finely divided inorganic pigments such as hydrated silica, precipitated aluminum silicates or sodium alumino silicates, calcium silicates, various metal oxides, and hydrates, such as alumina and the like. In general, the highest preferred solids content of the slurry is about 50 percent. However, in accordance with the present invention it has been found that the solids content of the slurry is not critical and that the method of the invention may be employed to prevent the pigment from settling from slurries containing a solids content on the order of from about 5–90 percent by weight. Economics dictate however, a minimum as well as a maximum solids content of the slurry, (this is usually on the order from about 20–50 percent by weight) and therefore from a practical standpoint the method of the invention is preferably practiced on slurries having a solids content in this range, i.e., from about 20–50 percent by weight.

While the invention may be used to stabilize slurries containing a wide variety of inorganic pigments, it has been unexpectedly discovered that the invention is particularly suitable for stabilizing slurries containing finely divided precipitated sodium alumino silicate pigments as disclosed in U.S. Pat. Nos. 2,739,073 and 2,848,346. Such pigments are commercially available and are sold under the trademark "Zeolex" by J. M. Huber Corporation. In general, these precipitated amorphous materials are composed of particles having ultimate sizes of only a few hundredths of a micron in diameter. They sometimes are designated as sodium aluminum silicates or sodium alumino silicates. In chemical compositions they typically contain $Na_2O$ and $Al_2O_3$ in a molar ratio near to 1, as in the range of from about 0.8 to 1.2 mols of $Na_2O$ per mole of $Al_2O_3$, together with silica ($SiO_2$) which can be present in any of various selected concentrations ranging from as little as 2.5 mols up to as much as about 16 mols of $SiO_2$ per mol of $Al_2O_3$. In U. S. Pat. No. 2,739,073 these pigments are prepared by comingling dilute solutions of an alkali silicate and an aluminum salt such as aluminum sulfate. In a preferred procedure in accordance with this patent, an amount of water equal to at least half the volume of the solutions to be added is placed in a suitable reaction vessel provided with a strong agitator. The reactants, i.e., the dilute solution of the alkali silicate and aluminum salt, are then introduced in streams entering the water at widely spaced points. In U.S. Pat. No. 2,848,346, the pigments are prepared by comingling a dilute solution of an alkali silicate and a dilute solution of a dispersion containing finely divided silica and aluminum sulfate, the latter being prepared by treating kaolin clay with a strong mineral acid, such as sulfuric acid.

The following Examples will serve to further illustrate the present invention but it should be expressly understood that they are not intended to limit it thereto.

EXAMPLE 1

In a series of tests, an aqueous slurry of a finely divided sodium aluminum silicate pigment (Zeolex) having a solids content of 29.6 percent was first evaluated by centrifuging samples of the slurry (treated as described hereinbelow) at 100g's. The rate of cake formation was used as a measure of the stability of the slurry.

In a series of 12 tests, 10 samples of the slurry were treated in accordance with the invention and compared against "controls" in which only the aluminum sulfate or alkaline earth metal salt was added (tests No's 5 and 9, respectively). The results are given in TABLE 1. These tests establish that the combination of the salt and acidic material is necessary to effectively stabilize the slurry and to prevent the formation of the cake.

The above procedure was repeated in a series of tests (Nos. 13–20) except that the acidic material (aluminum sulfate) was added before the magnesium salt (Test Nos. 14, 15, 18 and 19). In the control samples (tests Nos. 16 and 17) no salt was added. The results of these tests are given in TABLE 2 and establish (See Test Nos. 13 and 20) that the combination as well as the manner of addition is critical in obtaining maximum stabilization.

EXAMPLE 2

In a series of tests, the procedure of Example 1 was repeated except that the amount of the alkaline earth salt added was varied between 0.05 to 10 percent (by increments of 0.05 percent) based on the dry weight of the pigment. It was found that amounts less than 0.10 percent did not prevent the formation of the cake or heel. Otherwise the tests results were the same as shown in Tables 1 and 2.

EXAMPLE 3

The procedures of Examples 1 and 2 were repeated except that a precipitated hydrated silica of very fine particle size (sold under the trademark "Hi-Sil" by PPG Industries) was substitute for the Zeolex pigment. The tests results were the same as that of Examples 1 and 2.

EXAMPLE 4

The procedures of Examples 1 and 2 were repeated except that a fine particle-sized hydrated alumina (sold under the trademark "Hydral" by Aluminum Co. of Americal) was substituted for the Zeolex pigment. The test results were the same as that of Examples 1 and 2.

EXAMPLE 5

The general procedure of Example 1 was repeated except that a model plexiglas tank car (5 inches I.D. × 24 inches) was employed for the evaluation of the stability of the slurry. The model was placed on a spring loaded support which was thumped for 16 hours at one end to simulate the motion of a moving railroad tank car. The test results are shown in Table 3. The results of Test No. 7 confirm the importance of adding the magnesium oxide to the slurry prior to the addition of the aluminum sulfate. Test Nos. 3 and 4 show that the lowering of the pH of the treated slurry to 7.3 and 6.5 respectively instead of 7.5 further improves the stability of the slurry. In general Test Nos. 4 and 5 establish that there is no appreciable difference in the performance of MgO whether it rehydrates in the presence of the slurrry or whether it is rehydrated prior to its addition to the slurry.

EXAMPLE 6

The procedure of Example 5 was repeated except that a hydrated silica was substituted for the Zeolex pigment. The results of the tests were substantially the same as shown in Table 3.

EXAMPLE 7

Based on the data from the bench type tests of Examples 1–6, a 20,000 gallon tank car was loaded with an aqueous slurry of a finely divided sodium alumino silicate pigment (Zeolex) containing 30 percent solids.

TABLE 1

| Test No. | (Zeolex®)% Solids | Alkaline Earths Added | % Treatment Expressed as $Mg(OH)_2$ | ml Alum Solution Added at 540 g/l | Final pH | Comments |
|---|---|---|---|---|---|---|
| 1 | 29.6 | $MgSO_4$ | 0.5 | 4.0 | 7.5 | No heel and no difference |
| 2 | 29.6 | $MgSO_4$ | 1.0 | 4.0 | 7.5 | in tests 1–4, 6–8, and 10–12 |
| 3 | 29.6 | $MgCl_2$ | 0.5 | 3.7 | 7.5 | after 10 minutes of centrifuge |
| 4 | 29.6 | $Ca(OH)_2$ | 0.6 | 6.2 | 7.5 | |
| 5 | 29.6 | Control | none | 3.7 | 7.5 | No. 5 started caking after |
| 6 | 29.6 | $MgSO_4$ | 0.5 | 4.0 | 7.5 | 3 min; others did not after |
| 7 | 29.6 | $Mg(OH)_2$ | 0.5 | 3.8 | 7.5 | 10 min. |
| 8 | 29.6 | $MgSO_4$ | 0.5 | 4.0 | 7.5 | |
| 9 | 29.6 | $Mg(OH)_2$ | 1.0 | Control-none | 9.5 | No. 9 started caking after |
| 10 | 29.6 | $MgSO_4$ | 0.5 | 4.0 | 7.5 | 3 min; others did not after |
| 11 | 29.6 | $Mg(OH)_2$ | 0.5 | 3.8 | 7.5 | 10 min. |
| 12 | 29.6 | $MgSO_4$ | 0.5 | 4.0 | 7.5 | |

TABLE 2

| Test No. | (Zeolex®) % Solids | Alkaline Earths Added | % Treatment Expressed as $Mg(OH)_2$ | ml Alum Solution Added at 540 g/l | Final pH | Comments |
|---|---|---|---|---|---|---|
| 13 | 29.6 | $MgCO_3$ | 0.25 | 4.7 | 7.5 | Note in tests No. 14 and 15 |
| 14 | 29.6 | $Mg(OH)_2$ | 0.25 | 3.9 | 7.5 | alum added before $Mg(OH)_2$. |
| 15 | 29.6 | $Mg(OH)_2$ | 0.125 | 3.8 | 7.5 | Only No. 13 did not form a heel |
| 16 | 29.6 | None | Control | 3.7 | 7.5 | |
| 17 | 29.6 | None | Control | 3.7 | 7.5 | |
| 18 | 29.6 | $Mg(OH)_2$ | 0.25 | 3.9 | 7.5 | Note in No. 18 and 19 alum added |
| 19 | 29.6 | $MgSO_4$ | 0.25 | 3.9 | 7.5 | before magnesia. After 11 min. |
| 20 | 29.6 | $MgSO_4$ | 0.25 | 3.9 | 7.5 | No. 20 did not have any heel. |

The slurry was treated with 0.34 percent magnesium oxide (based on the dry weight of the pigment) and aluminum sulfate was then added to lower the pH of the slurry from about 9.5 down to 7.3. After three weeks no heel or cake had formed and the car was pumped out easily and was rinsed clean.

remaining slurry was rinsed clean with 25–50 gallons of water. The entire operation required only 1 hour.

EXAMPLE 11

A 20,000 gallon tank car was loaded and shipped in accordance with the procedure of Example 10 except

TABLE 3

| Test No. | (Zeolex) % Solids | Treatment | % Treatment Expressed as $Mg(OH)_2$ | mls Alum Added at 540 g/l | pH at Start of Test | pH change during 16 hours of Test | Inches of Cake in Tank |
|---|---|---|---|---|---|---|---|
| 1 | 27.4 | None | Control | 119 | 7.3 | +0.5 | .1 |
| 2 | 27.4 | MgO | 0.34 | 132 | 7.3 | +0.6 | ¾ |
| 3 | 29.6 | MgO | 0.34 | 123 | 7.3 | +0.6 | ¾ |
| 4 | 29.6 | MgO | 0.34 | 152 | 6.5 | +0.9 | ¼ |
| 5 | 29.6 | MgO (added as slurry) | 0.34 | 156 | 6.6 | +0.5 | ¼ |
| 6 | 30.4 | MgO (added after $Al_2(SO_4)_3$) | 0.34 | 139 | 7.1 | +0.5 | ½ |
| 7 | 30.4 | MgO (added before Aluminum Sulfate as slurry) | 0.34 | 188 | 6.5 | +1.0 | ¼ |

EXAMPLE 8

The procedure of Example 7 was repeated except that sulfuric acid was employed as the acidic material. After one weeks no heel or cake had formed and the car was pumped out easily and rinsed clean.

EXAMPLE 9

Example 7 was repeated except that the pH of the slurry, after the addition of the magnesium oxide, was adjusted to 6.5. After three weeks, no heel had formed and the car was pumped out easily and rinsed clean.

EXAMPLE 10

A 20,000 gallon tank car was loaded with an aqueous slurry of a finely divided sodium alumino silicate pigment (Zeolex) containing 30 percent solids. The slurry had an initial pH of 10. The slurry was treated with 0.33 percent magnesium oxide, based on the dry weight of the pigment. Sufficient aluminum sulfate was then added to lower the pH of the slurry from about 10 down to 7.0 The tank car was opened after five days of travel and the slurry was pumped out. The slurry was homogeneous throughout as evidenced by concentration of the slurry samples taken from the top, middle and bottom of the tank car. The car was pumped out easily with only 1 to 2 inches of slurry remaining. This that the solids content of the slurry was 50 percent. The car was pumped out easily with only 1 to 2 inches of slurry remaining.

As will be readily appreciated by those skilled in the art, the present invention provides a new and improved method for stabilizing aqueous slurries of inorganic pigments. As previously discussed it has been determined that the addition of the alkaline earth metal salt affects the rheology as well as the stability of the slurry. In this regard, the FIGURE illustrates how the addition of 0.5% $Mg(OH)_2$ (based on the weight of the dry pigment) increases the viscosity of slurries containing finely divided precipitated sodium alumino silicate pigments (Zeolex). Slurries treated with 0.5% $Mg(OH)_2$, followed by the addition of aluminum sulfate to reduce the pH to from about 6.5 to 7.5, are very thixotropic and have rapid shear thinning characteristics. While not intending to be bound by any particular theory, it is believed that the effectiveness of the present invention is based, in part, upon this change in rheology.

As a final point, and as indicated above, a significant consideration in the addition of inorganic salts or other additives to stabilize slurries of inorganic pigments is the effect thereof on the properties or characteristics of the resulting pigment. Table 4 strikingly illustrates that the addition of magnesium salts does not adversely affect the paper properties of Zeolex slurries.

TABLE 4

PAPER PROPERTIES OF ZEOLEX R SLURRIES TREATED WITH MAGNESIA

| Pigment | Slurry pH | % FIL | % Pigment Retention | TAPPI Brightness | TAPPI Opacity |
|---|---|---|---|---|---|
| Zeolex ® filter cake slurry (Control) | 9.5 | 3 | 41 | 88.3 | 82.2 |
|  |  | 6 | 41 | 89.2 | 83.7 |
|  |  | 9 | 41 | 90.0 | 84.8 |
| Zeolex ® filter cake slurry treated with 2% $Mg(OH)_2$ | 9.7 | 3 | 46 | 88.0 | 82.1 |
|  |  | 6 | 45 | 88.9 | 83.7 |
|  |  | 9 | 44 | 89.4 | 84.7 |
| Zeolex ® filter cake slurry treated with 4% $MgSO_4$ (equals 2% $Mg(OH)_2$) | 9.3 | 3 | 39 | 88.2 | 82.0 |
|  |  | 6 | 39 | 89.0 | 83.5 |
|  |  | 9 | 39 | 89.6 | 84.4 |
| Standard Zeolex |  | 3 | 39 | 87.9 | 82.5 |
|  |  | 6 | 38 | 88.7 | 84.4 |
|  |  | 9 | 36 | 89.3 | 86.0 |

What is claimed is:

1. A method for stabilizing an aqueous slurry containing a finely divided particulate pigment of submicron size, said method consisting essentially of forming an aqueous slurry of inorganic pigments having a solids content in the range of from about 10–50 percent by weight, said pigment being selected from the group consisting of finely divided sodium alumino silicates, hydrated silica and aluminum hydrate; contacting said aqueous slurry with an alkaline earth metal compound selected from the group consisting of $Mg(OH)_2$, $MgO$, $MgSO_4$, basic $MgCO_3$, $MgCl_2$, $Ca(OH)_2$, $CaO$, $CaSO_4$, $CaCO_3$, and $CaCl_2$, said alkaline earth metal compound being added in an amount of from about 0.1 percent to 10.0 percent by weight based on the dry weight of said pigment and reducing the pH of the resulting pigment slurry by the addition of an acidic material in an amount sufficient to provide a slurry pH of from about 6.0 to 8.6 and to thereby provide a homogeneous slurry of said alkaline earth metal compound said pigments that remain in suspension for extended periods of time while not affecting the characteristics or properties of the said pigments.

2. The method in accordance with claim 1 wherein said alkaline earth metal compound is introduced in an amount in the range of from 0.25 percent to 3.0 percent by weight, based on the dry weight of the pigment and said acidic material is added in an amount sufficient to produce a slurry pH of from about 6.5 to 7.5.

* * * * *